United States Patent [19]
Ferris

[11] 3,720,389
[45] March 13, 1973

[54] EXPULSION BLADDER

[75] Inventor: Delacy F. Ferris, Van Nuys, Calif.

[73] Assignee: The United States of America as represented by the Secretary of the Navy

[22] Filed: Oct. 22, 1970

[21] Appl. No.: 83,056

[52] U.S. Cl. ............................................244/135 B
[51] Int. Cl. ......................B64d 37/24, B64d 37/10
[58] Field of Search ....244/135 R, 135 B; 222/386.5; 220/85 B; 60/39.48, 259

[56] References Cited

UNITED STATES PATENTS

| 3,286,878 | 11/1966 | Schadt et al. | 60/39.48 X |
| 3,404,813 | 11/1971 | Waxman | 222/386.5 |
| 3,043,542 | 7/1962 | Neuschotz | 244/135 R |
| 2,508,906 | 5/1950 | Cunningham | 244/135 R |

Primary Examiner—Milton Buchler
Assistant Examiner—Gregory W. O'Connor
Attorney—Richard S. Sciascia, Q. Baxter Warner and Gayward N. Mann

[57] ABSTRACT

A missile fuel tank having a three lobed bladder supported by an internal structural framework with two lobes of the bladder bonded to the fuel tank wall. This arrangement prevents flexing of the bladder upon acceleration of the vehicle and aids in maintaining missile stability.

3 Claims, 2 Drawing Figures

PATENTED MAR 13 1973 3,720,389

DE LACY F. FERRIS
INVENTOR

BY *Hayward N. Mann*
*Q. Baxter Warner*
ATTORNEYS

EXPULSION BLADDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to fluid fuel or propellant tanks and more particularly to such tanks having a multiple lobed bladder therein.

2. Description of the Prior Art

Collapsible fuel storage devices are well known in the prior art. However, in many such storage devices which are used in missile propulsion systems and particularly those having a multiple lobed bladder positioned therein, serious problems have been encountered in maintaining vehicular stability. This is caused by one lobe of the bladder emptying initially and creating a void toward which the propellant in the remaining bladder lobes will move.

In missile fuel tanks having bladders portioned into three lobes, such stability is controlled by bonding two of the three bladder lobes temporarily to the storage device wall while the uppermost or third lobe remains unbonded.

SUMMARY OF THE INVENTION

This invention comprises generally a missile propellant tank having an internal framework which supports a bladder positioned inside the tank and induces a three lobe fold in the bladder. In order to maintain missile stability, two of the three lobes are temporarily bonded to the tank wall while the third lobe remains unbonded. Thus, the propellant in the bonded two lobes will empty in a normal manner instead of rushing toward the void created by the initial emptying of the third unbonded lobe.

STATEMENT OF THE OBJECTS OF THE INVENTION

One objective of the invention is to provide a novel missile propellant tank having a lobed bladder therein which eliminates the stability problem encountered heretofore.

Another objective of the invention is to provide a missile propellant tank having three lobes which collapse in an orderly pre-arranged fashion to maintain missile stability.

Still another objective of the invention is to provide a novel missile propellant tank having a single bladder with three lobes which is simple to fabricate and reliable in operation.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
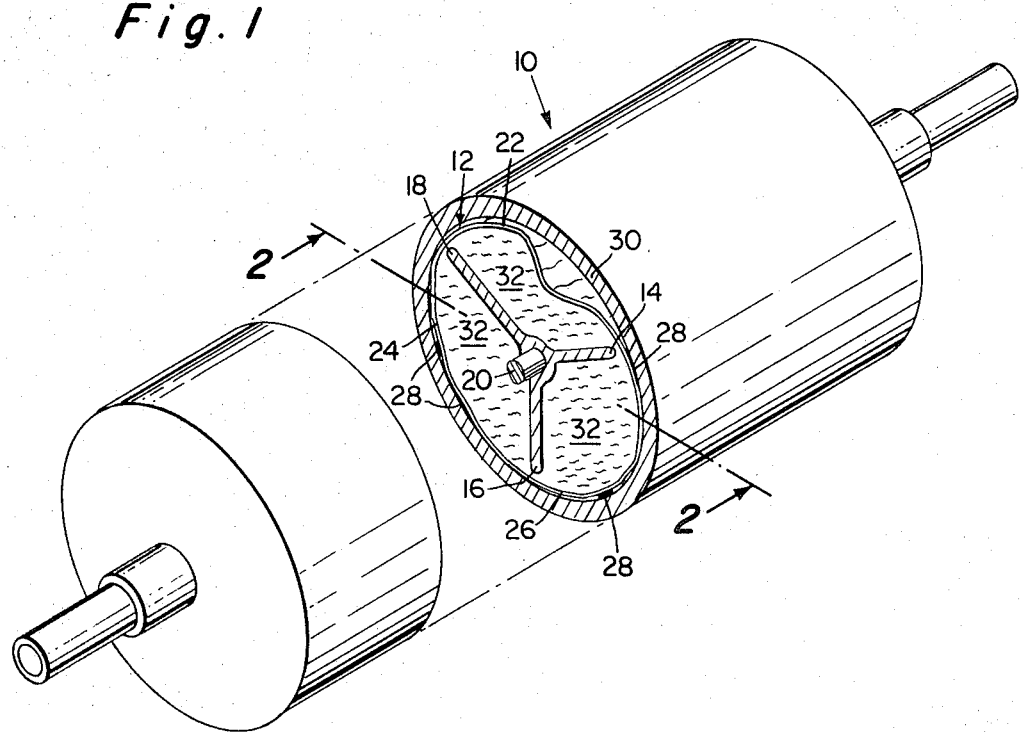
FIG. 1 is an isometric view partially cut away to show the three lobes.
Figure 2:
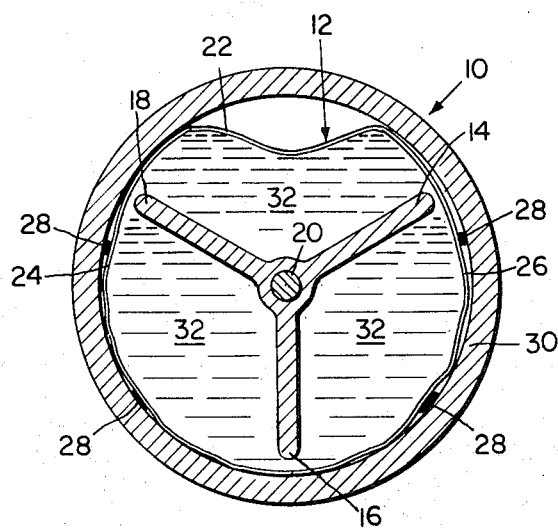
FIG. 2 is an enlarged sectional view taken along the lines 2—2 of FIG. 1 showing the bladder with two of the lobes bonded to the tank wall.

Referring to the drawing, there is shown a missile propellant tank 10 having a single internal bladder 12 supported by three spaced struts 14, 16 and 18 substantially as shown in FIG. 2. Each strut 14, 16 and 18 is joined to the centralized axial rod 20. The collapsible bladder 12 which may be constructed of any suitable material but preferably of aluminum is draped around the struts 14, 16 and 18 and is accordingly portioned into three lobes 22, 24 and 26. The lobes 24 and 26 are temporarily bonded at 28 by any satisfactory substance including Teflon to the wall 30 of tank 10. The third lobe 22 remains unbonded.

Thus, the foregoing structure assures that bladder lobe 22 will empty first before the lobes 24 and 26 pull away from temporary bond 28 and start to empty the enclosed fluid 32. By controlling the collapse of bladder lobes 24 and 26 the missile center of gravity remains relatively stable, hence improved missile stability is assured.

Obviously many modifications and variations of the present invention are possible in the light of the above teachings. It is therefore to be understood that within the scope of the appended claims the invention may be practiced otherwise than as specifically described.

I claim:

1. A fluid storage and expulsion container for missiles comprising:

a tank;

a framework positioned within the interior of said tank, said framework including three imperforate spaced struts joined at one end along the length of a central axial rod and extending along substantially the length of the axial rod, said struts being unattached at their outer ends;

a collapsible bladder positioned within said tank and supported by the framework, said framework adapted to separate the bladder into three interconnected lobes, said bladder adapted to hold the fluid stored in said tank, said bladder also being draped over the struts to induce the three lobed effect on the bladder and;

at least two of said bladder lobes bonded to the interior of said tank;

thus the bladder collapse is controlled which enables the center of gravity of the vehicle to remain stable.

2. The fluid and storage container of claim 1 wherein: two bladder lobes are temporarily bonded to the tank wall to permit selective bladder collapse.

3. The fluid storage and expulsion contour of claim 1 wherein:

the bladder is constructed of aluminum.

* * * * *